June 13, 1944.   R. E. LEMBCKE   2,351,527
REFINING LOW BOILING ALCOHOLS
Filed April 22, 1941
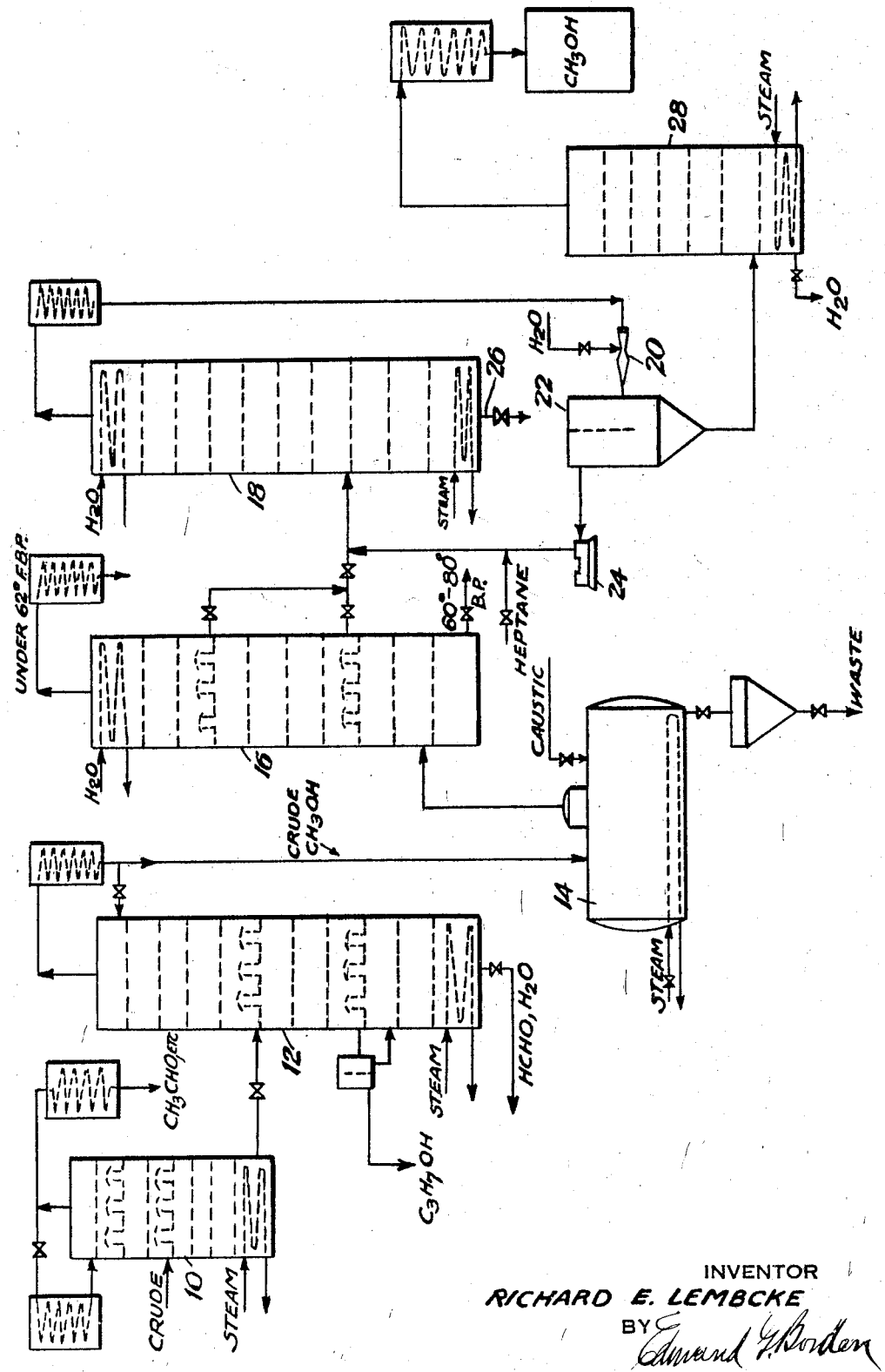
INVENTOR
RICHARD E. LEMBCKE
BY
ATTORNEY Patented June 13, 1944

2,351,527

UNITED STATES PATENT OFFICE 2,351,527

REFINING LOW-BOILING ALCOHOLS

Richard E. Lembcke, Tallant, Okla., assignor to Cities Service Oil Company, Bartlesville, Okla., a corporation of Delaware Application April 22, 1941, Serial No. 389,716

6 Claims. (Cl. 202—42)

This invention relates to the refining of low boiling alcohols, and is directed particularly to the purification of crude methanol containing small amounts of empyreumatic impurities having boiling points so close to that of pure methanol that separation of the methanol by ordinary fractional distillation is not practical.

Methanol is obtained as a product of wood distillation, and is also produced synthetically from carbon monoxide and hydrogen, and by partial oxidation of gaseous aliphatic hydrocarbons such as are present in natural gas and petroleum refinery gases. The crude methanol produced by any of the aforementioned methods usually contains small amounts of impurities, some of which impart an offensive odor. The impurities which are responsible for imparting the bad odor are present in very small concentration, and they are extremely difficult to identify. These odor-imparting impurities will be referred to herein under the generic term "empyreumatic impurities."

A primary object of the present invention is to provide a new and practical method for treating crude methanol to produce a refined product substantially uncontaminated with such empyreumatic impurities.

A more particular object is to provide a method for refining and purifying the methanol and n-propyl and isopropyl alcohol fractions of the crude liquid product which is produced by partial oxidation of aliphatic hydrocarbon components of natural gas and refinery tail gases.

An important feature of the present process is that of fractionally distilling the crude methanol containing empyreumatic impurities in the presence of a compound which forms a minimum boiling azeotropic mixture with the methanol. The process is applicable to crude methanol fractions having a relatively wide boiling range, and may also be applied to the purification of crude propyl alcohol fractions. The preferred process involves fractional distillation of crude methanol in the presence of an azeotrope-forming compound which is taken from the group consisting of hexane and heptane. Hexane and heptane both form azeotropes with methanol the boiling points of which are several degrees below the boiling points of the empyreumatic impurities, so that said impurities can be separated as a residue by fractional distillation overhead of the methanol azeotrope.

With the above and other objects and features in view the invention consists in the improved process of refining and purifying crude methanol which is hereinafter described and particularly defined by the accompanying claims.

In the following description illustrative examples will be given of the manner in which the invention is practiced for refining and purifying the methanol and propyl alcohol fractions of the crude product produced by partial oxidation of gaseous aliphatic hydrocarbons. The crude liquid product of such partial oxidation operation consists of an aqueous solution containing a large number of compounds including formaldehyde, methanol, acetaldehyde, acetone, acetals, propyl and isopropyl alcohols, and small amounts of condensation and decomposition products. By ordinary fractional distillation this crude liquid product can be separated into a low boiling acetaldehyde fraction, a second fraction comprising chiefly crude methanol, a third fraction comprising chiefly higher boiling propyl alcohols, and a residue consisting chiefly of crude aqueous formaldehyde. This fractional distillation may be carried out within stills 10 and 12 of the accompanying flow sheet.

The crude methanol fraction referred to above may be partially purified of certain aldehyde impurities by polymerization reaction with caustic soda. According to this preliminary purification step, the preferred practice is to heat the crude methanol in a batch still 14 with caustic soda in amounts sufficient to polymerize any aldehyde impurities present, and to drive off vapors of the partially purified methanol overhead, leaving the waste caustic and aldehyde polymers as a residue in the still. This preliminary purification operation can be combined with fractional separation of the crude methanol vapors within a fractionating column 16 into fractions of narrow boiling range.

Crude methanol, even after this type of partial purification, and irrespective of the care with which it is fractionally distilled, contains small amounts of acetone and dimethyl acetal as well as certain of the empyreumatic impurities referred to above which impart thereto a sharp offensive odor. While such impurities have not been identified, it is suspected that they may be related in character to acrolein. For testing purposes, the total amount of such empyreumatic impurities which is present in the crude may be roughly determined by comparing the color produced when the crude methanol is mixed with an equal volume of strong sulfuric acid, with the color produced when treating with the strong sulfuric acid in the same way a solution of methanol containing a variable known amount of dimethyl acetal. The amount of empyreumatic impurities present in the crude methanol may then be expressed as percent "apparent" dimethyl acetal.

A preferred method of applying the process of the invention to the purification of crude methanol may be generally characterized as a semicontinuous method. According to this method commercial heptane (having a boiling range of 180–220° F.) is added to the crude methanol in the proportions of 15%–100% or more by volume, and the mixture is heated in a fractionating still 18 from which a methanol-heptane azeotrope is taken off as an overhead distillate. This fractional distillation is carried out in a bubble plate column or its equivalent with controlled countercurrent reflux; and the distillate produced contains 38–45% by weight of methanol and has a boiling range of 55–61° C. The spread in methanol content of the distillate, and the spread in the boiling range, is the result of the differences in methanol content and boiling points of the azeotropes of the different hydrocarbons present in the commercial heptane used, and of the presence of a small amount of impurities such as acetone distilled over from the methanol charge.

It has been observed that the azeotrope distillate is of uniform composition, both as a vapor and as a liquid, at temperatures above 44° C., but that when the liquid azeotrope is cooled below 44° C. it separates into a top layer consisting chiefly of heptane and a bottom layer consisting chiefly of methanol, the composition of each layer depending on the limiting solubilities of each component of the azeotrope in the other at the existing temperature. This particular characteristic of the azeotrope may be used for effecting separation of the azeotrope components.

The preferred method of separating the azeotrope distillate into its components is by adding to the distillate about 30% by volume of water, with agitation in a mixer 20. It is not necessary to use an appreciably higher volume of water, and a substantially lower volume will not give the complete separation which is desired. The added water promotes separation of the azeotrope into its respective components in separator 22, the upper layer comprising practically pure heptane and containing at least 95% of the heptane originally present in the azeotrope. The bottom layer consists of aqueous methanol containing a small amount of heptane in solution.

The separated heptane layer is withdrawn from the separator and may be returned by pump 24 to the still 18 as replenish heptane for use in removing additional methanol as an azeotropic distillate. The azeotropic distillation is continued until the boiling temperature of the azeotrope rises to 61° C., which is an indication that the methanol content of the original crude charge is near the exhaustion point. The preferred method of operation contemplates continuous addition of separated heptane to the still, periodic addition of more impure methanol to the still kettle, and operation of the still under reflux conditions which hold the azeotropic distillate within the 55°–61° C. boiling range. Under the above conditions, the operation of the still can be continued over a fairly long cycle, the end of the cycle being reached when accumulations of residual impurities in the still make it advisable or desirable to suspend the operation and remove such impurities. Continuous operation can be effected by periodic withdrawal of residual impurities from the still kettle at 26. However the material thus withdrawn during continuous operation contains some methanol and some heptane, the recovery of which requires additional processing.

The last step in the preferred operation is that of separating the water from the purified methanol by fractional distillation in still 28. This distillation is preferably carried out in such a way as to concentrate the first few percent of overhead distillate containing all of the heptane, and to also accumulate as a second fraction the small content of acetone and of dimethyl acetal which distil overhead from the aqueous methanol solution at a temperature slightly below that at which substantial amounts of methanol are vaporized. Both the acetone and the dimethyl acetal apparently form azeotropes with methanol which boil below 58° C. Consequently they can be removed by proper fractional distillation as a preliminary distillate during the fractional distillation of the aqueous methanol. The contaminated front ends of the final methanol fractionation may be refractionated to increase the ultimate yield of pure methanol. The acetone and dimethyl acetal which are present in the crude methanol have boiling points sufficiently close to that of methanol so that it is not practical to attempt complete separation thereof from the crude methanol prior to the azeotropic distillation step.

The empyreumatic or odor-producing impurities in the crude methanol either have boiling points so close to that of methanol, or form azeotropes with boiling points so close to methanol, that they cannot be removed from the crude methanol by ordinary fractional distillation. The addition to the crude methanol of azeotrope-forming compounds such as commercial hexane and heptane makes it possible to remove the methanol as an overhead azeotrope distillate at a temperature below the boiling point of the impurities or of the methanol-impurities azeotropes. The impurities do not form azeotropes with the hexane or heptane, and consequently are retained in the still as a residue throughout the azeotropic distillation step.

As illustrating the degree of purification which it is possible to secure by a single batch distillation operation, a narrow boiling range fraction of the crude methanol was treated after determination of its composition, which showed that it contained 3.1% of true dimethyl acetal and empyreumatic impurities expressed as "apparent" dimethyl acetal by the sulfuric acid test method previously referred to, together with a .2% acetone content by Nessler's acetone method. To a 200 cc. sample of this crude methanol fraction, boiling in the range 64.3°–66.6° C., there was added 300 cc. of a commercial heptane fraction having an Engler type distillation range of 190°–212° F. The mixture thus formed was fractionally distilled under a 7–1 reflux ratio in a laboratory fractionating column, yielding 450 cc. of azeotrope distillate having a boiling range of 55°–61° C. The residue remaining in the still contained the excess heptane charged together with the empyreumatic impurities and a small amount of methanol. After adding about 130 cc. of water to the azeotrope distillate, with agitation, the aqueous mixture was allowed to separate into two layers. The upper layer was chiefly heptane of sufficient purity to permit of its reuse. The aqueous bottom layer was fractionated in such a way as to yield a primary fraction of 38 cc. volume containing all of the heptane not previously separated, together with most of the true acetone and dimethyl acetal which were present in the original crude methanol. A second fraction consisted of 148 cc. of methanol containing as impurities less than .01% acetone and less than .05% empyreumatics measured by the "apparent" dimethyl acetal test method. Refractionation of the fractions thus obtained will further concentrate the impurities into a smaller primary fraction, if such further purification is desired.

Experiments have shown that the methods of the present invention are operable with refractionation to yield over 70% of the original charge as methanol having less than 0.1% total impurities and having a true methanol odor. Attempts at purification of the same crude methanol fraction by ordinary repeated fractional distillations have shown that it is impossible to produce any methanol fraction containing less than .2% empyreumatics, and that it is also impossible to produce any methanol fraction having a greatly improved odor over that of the original crude methanol fraction.

The method of the present invention is applicable not only to the purification of crude methanol, but also to the purification of crude n-propyl and isopropyl alcohols, and to the treatment of crude mixtures or fractions of methanol and propyl alcohols. For example, a crude mixture of methanol and higher alcohols containing several percent of empyreumatic impurities, and having a boiling range of 60°–88° C., when treated by the present process employing heptane as the azeotrope-forming material, yielded from the aqueous extract of the overheat distillate on a single distillation a fraction having a boiling range of 64°–81° C. with a clean alcoholic odor and containing less than .4% empyreumatics.

When a crude alcohol fraction having a wide boiling range is treated by the present process, the fractional distillation of the bottom layer produced by addition of water to the azeotrope distillate may be conducted in such a way as to separate the product into fractions of narrow boiling range. In this way the principal part of the methanol, for example, can be concentrated in a fraction having a narrow boiling range of 64°–65° C.

When treating a mixture of crude alcohols in accordance with the present process, the preferred method, as previously indicated, is to first treat the raw alcohols with caustic soda to destroy or polymerize aldehyde impurities, to then partially separate the alcohols by fractional distillation, and to thereafter proceed with the azeotropic distillation purification of the alcohol fractions in the manner described. This preferred method may be varied by treating the original crude mixture of alcohols immediately to azeotropic distillation, followed by separation of the distillate by means of water, and the water extract thereafter refluxed with caustic to destroy the aldehydes, and then fractionated to recover the alcohols. Another modification of the preferred process would consist in first refluxing the raw alcohol fraction with caustic to destroy the aldehydes, thereafter subjecting the partially purified alcohols to azeotropic distillation with hexane or heptane, and after separating the distillate with water, fractionating the aqueous alcohol to recover the alcohol components. Whichever method of treatment is employed it will be found that the resulting final alcohol fraction has been freed of the sharp unpleasant odor which was present prior to the azeotropic distillation step, and that the empyreumatic impurities have in all cases been reduced to less than .4%, even when the original crude contained over 6% of such impurities prior to the azeotropic distillation step.

Commercial octane (having a boiling range of 105°–128° C.) forms an azeotrope with crude methanol having a boiling range of 59.1°–63° C. Consequently octanes are not as efficient as heptanes or hexanes when used for purifying methanol, although the octanes give results much superior to ordinary fractional distillation. Octanes can be used to advantage in purifying higher boiling alcohols such as the propyl alcohols. The preferred materials for use in accordance with the present process for refining methanol by azeotropic distillation are the hexanes and heptanes. With commercial hexane of 142°–158° F. boiling range, crude methanol forms an azeotrope which boils in the range 45°–52° C.

While the process of the present invention is particularly directed to the purification of crude methanol and n-propyl and isopropyl alcohols, it is also useful for separating and concentrating the acetone and dimethyl acetal components present in such crude methanol and for purifying such materials of empyreumatic impurities originally associated therewith in the crude methanol by a method of azeotropic distillation of the alcohol with a compound such as hexane or heptane.

For refining and separating higher boiling alcohols (for example normal propyl), which form water azeotropes distilling in the range 81°–100° C., best results are obtained employing relatively pure azeotrope-forming compounds such as a pure octane in order to produce an azeotrope having a constant boiling point, and not a boiling point having a relatively wide range such as the azeotrope produced by methanol and the mixed hydrocarbons present in commercial heptane.

The indicated temperatures at which the operations are carried out are those employed when the pressure is substantially atmospheric. However, the process of azeotropic distillation may be practiced over a rather wide range of pressures both above and below atmospheric, and consequently within a wide range of temperatures.

Having thus described the invention, what is claimed as new is:

1. The process of refining crude methanol which comprises, fractionally distilling the crude in the presence of commercial heptane under controlled conditions of reflux to distil overhead substantially all the methanol as a minimum boiling methanol-heptane azeotrope distillate, adding water to the distillate, allowing the aqueous mixture to separate by gravity into a top layer of heptane and a bottom aqueous methanol layer, returning heptane from the separated top layer to the distillation zone for use in continuing the azeotropic separation of methanol from the crude, and fractionally distilling the aqueous methanol layer to recover a substantially impurity-free methanol cut.

2. A process of refining crude methanol which comprises distilling the crude methanol and separating impurities therefrom by boiling with caustic soda, condensing the partially purified methanol distillate and adding heptane thereto in amount sufficient to form a minimum-boiling azeotropic mixture with all of the methanol present, and subjecting the mixture thus formed to fractional distillation with reflux to distil overhead substantially all the methanol as a predominantly impurity-free minimum-boiling azeotropic mixture of the methanol and heptane.

3. The process of refining the methanol content of a crude mixture of methanol, acetone, dimethyl acetal and empyreumatic impurities which comprises, subjecting the mixture to fractional distillation in the presence of commercial heptane in amount sufficient to form a minimum-boiling azeotropic mixture with the methanol content of the crude, under controlled conditions of temperature and reflux to distil overhead substantially all the methanol as a predominantly impurity-free minimum-boiling azeotrope distillate of the methanol and heptane, adding water to the distillate, allowing the aqueous mixture to separate by gravity into a top layer of heptane and a bottom aqueous methanol layer, and fractionally distilling the aqueous methanol to dehydrate and further purify the methanol present.

4. A process of separating methanol from a crude mixture thereof with empyreumatic impurities, which comprises fractionally distilling said mixture in the presence of a liquid paraffin hydrocarbon having between five and nine carbon atoms to the molecule and which is capable of forming a minimum-boiling azeotropic mixture with methanol, said paraffin hydrocarbon being present in amount sufficient to form an azeotrope with all of the methanol present, controlling the temperature and volume of reflux so as to fractionally distil overhead substantially all of the methanol as a predominantly impurity-free minimum-boiling azeotrope of the methanol and the paraffin hydrocarbon, adding water to the overhead distillate mixture of methanol and paraffin hydrocarbon in amount sufficient to effect a separation of the mixture into an aqueous methanol layer and a hydrocarbon layer of said paraffin hydrocarbon, and fractionally distilling the separated aqueous methanol layer to yield a substantially pure methanol distillate.

5. The process defined in claim 4 in which the azeotrope-forming hydrocarbon is commercial hexane.

6. The process defined in claim 4 in which the azeotrope-forming hydrocarbon is commercial octane.

RICHARD E. LEMBCKE.